United States Patent [19]
Stanek

[11] Patent Number: 5,741,341
[45] Date of Patent: Apr. 21, 1998

[54] PORTABLE/MOUNTABLE AIR CLEANER

[75] Inventor: Terrence L. Stanek, St. Charles, Mo.

[73] Assignee: Emerson Electric Co., St. Louis, Mo.

[21] Appl. No.: 683,711

[22] Filed: Jul. 18, 1996

Related U.S. Application Data

[63] Continuation-in-part of Ser. No. 514,995, Aug. 14, 1995, abandoned.

[51] Int. Cl.⁶ .................................................. B01D 29/00
[52] U.S. Cl. .............................. 55/356; 55/357; 55/467
[58] Field of Search ........................ 15/301; 55/274, 55/282, 356, 357, 358, 370, 372, 373, 431, 471, 472, 473, 485, 493, 508, 467, DIG. 8, DIG. 18

[56] References Cited

U.S. PATENT DOCUMENTS

| | | | |
|---|---|---|---|
| 842,661 | 1/1907 | Hein | 55/372 |
| 1,006,271 | 10/1911 | Powers | 55/372 |
| 2,392,205 | 1/1946 | Wales | 55/356 |
| 2,478,393 | 8/1949 | Haarman | |
| 2,707,527 | 5/1955 | Brace | |
| 2,776,726 | 1/1957 | Brace | |
| 2,945,554 | 7/1960 | Berly | |
| 2,979,755 | 4/1961 | McCaskill | 15/314 |
| 3,066,345 | 12/1962 | Kasper | 15/310 |
| 3,127,629 | 4/1964 | Miller, Jr. | 55/DIG. 8 |
| 3,166,393 | 1/1965 | Stevens | 55/DIG. 8 |
| 3,286,446 | 11/1966 | Happe et al. | 55/472 |
| 3,308,608 | 3/1967 | Brimberg | 55/356 |
| 3,676,986 | 7/1972 | Reiling | 55/472 |
| 3,802,168 | 4/1974 | Deckas | 55/473 |
| 3,923,482 | 12/1975 | Knab et al. | 55/DIG. 18 |
| 3,930,818 | 1/1976 | McDougall | 55/414 |
| 4,222,753 | 9/1980 | Mills | 55/274 |
| 4,419,112 | 12/1983 | Kawamura | 55/480 |
| 4,917,713 | 4/1990 | Helmus | 55/472 |
| 4,984,071 | 1/1991 | Klein | 55/274 |
| 5,018,238 | 5/1991 | Nelle | 15/314 |
| 5,443,625 | 8/1995 | Schaffhausen | 55/472 |

FOREIGN PATENT DOCUMENTS

| | | | |
|---|---|---|---|
| 894 151 | 10/1953 | Germany | 15/301 |
| 418029 | 10/1934 | United Kingdom | 55/508 |

Primary Examiner—C. Scott Bushey
Attorney, Agent, or Firm—Arnold, White & Durkee

[57] ABSTRACT

A portable/mountable air cleaner is disclosed. The air cleaner includes an elongated body which contains the air cleaner unit and an integral carrying handle extending from one side of the elongated body. Spaced suspension straps are associated with the elongated body for mounting same relative to a sealing or wall structure. The air cleaner unit within the elongated body includes an integrally molded motor frame and fan venturi within the elongated body. The integrally molded motor frame supports the motor within the elongated body while the fan venturi is located in the vicinity of a motor driven fan blade to facilitate the flow of air through the elongated body.

17 Claims, 3 Drawing Sheets

PORTABLE/MOUNTABLE AIR CLEANER

CROSS-REFERENCE TO RELATED APPLICATION

This is a continuation-in-part of patent application Ser. No. 08/514,995 filed Aug. 14, 1995, entitled SELF-CONTAINED PORTABLE/MOUNTABLE AIR CLEANER, now abandoned.

BACKGROUND OF THE INVENTION

The present invention relates to a portable/mountable air cleaner, and more specifically, to an air cleaner which includes a carrying handle extending from an air cleaner elongated body and spaced suspension straps associated with the elongated body for mounting same relative to a ceiling or wall structure.

Because home and industrial workshops generate a substantial quantity of saw dust and other free particulate matters which are readily dispersed in the air, fine dust air cleaners have been developed. They are generally of two types: a floor mounted/console unit or a ceiling/wall mounted device. Typical examples of floor mounted/console units are shown in U.S. Pat. Nos. 3,802,168 and 4,894,071 which utilize rollers or wheels to move the fine dust air cleaner to a desired location. An example of a ceiling or wall mounted air cleaner device is shown in U.S. Pat. No. 3,930,818 where a more permanent type of mounting system is used.

Air cleaners with forced air filters and associated blowers are generally preferable over electrostatic type air cleaners because of lower cost, easier installation and maintenance, and higher capacity. On the other hand, air cleaners utilizing forced air filters and associated blowers have been unable to process large amounts of highly contaminated air and have also been difficult to service for cleaning and/or replacement of filters. As also indicated above, prior art air cleaners have either been of the portable or mountable type, but typically have not been both. Some users have preferred to move an air cleaner unit to a desired location, while others prefer to mount the air cleaner in a more permanent location. As disclosed in the aforementioned copending patent application, it is possible to provide a self-contained portable/mountable air cleaner which can provide both the portable and mountable desired functions.

According to the present invention, the portable/mountable air cleaner discloses an optional mounting strap system which facilitates installation when mounting to a ceiling, wall or other structure. Furthermore, the present invention discloses an improved integrally molded frame and fan venturi to facilitate mounting of a motor within the air cleaner while enabling the fan venturi to be located in the vicinity of a motor driven fan blade to facilitate the flow of air through the air cleaner.

SUMMARY OF THE INVENTION

Among the several objects and advantages of the present invention include:

The provision of a new and improved portable/mountable air cleaner;

The provision of the aforementioned air cleaner which includes a carrying handle for transporting the air cleaner to a desired location or for mounting the air cleaner to a ceiling, wall or other structure, as may be desired.;

The provision of the aforementioned air cleaner which can be mounted to a ceiling structure either within the ceiling joist or across the ceiling joist;

The provision of the aforementioned air cleaner which includes optional spaced suspension straps that are detachably associated with the air cleaner to facilitate portable or mounting use of the air cleaner;

The provision of the aforementioned air cleaner which includes an integrally molded motor frame and fan venturi for supporting a motor while positioning the fan venturi in the vicinity of a motor driven fan blade to facilitate the flow of air through the air cleaner;

The provision of the aforementioned air cleaner which is relatively simple in construction; light weight; compact; includes an integral handle for ease of transportation; includes detachable suspension straps for mounting to a ceiling, wall, or other structure; can be easily and quickly turned on and off; and is otherwise well adapted for the purposes intended.

Briefly stated, the portable/mountable air cleaner of the present invention includes an elongated body containing an air cleaner with a power driven fan blade. A supporting base extends from the elongated body for resting on a supporting surface. A carrying handle extends from the elongated body generally opposite the supporting base to facilitate carrying of the air cleaner. Spaced suspension straps are associated with the elongated body for mounting the elongated body to a ceiling or wall structure.

The spaced suspension straps are preferably detachably associated with the elongated body. The spaced suspension straps also preferably extend transversely to the elongated body and extend through spaced slots formed in the elongated body. Preferably, the spaced slots are formed in the carrying handle on each side of an opening in the carrying handle that is large enough to facilitate grasping by a user. Fasteners such as hook fasteners or the like may be attached to each of outer ends of the spaced suspension straps for engaging complementary fasteners mounted to the ceiling or wall structure.

Preferably, the elongated body is configured, arranged, and dimensioned to fit between the joists in a ceiling structure.

A switch for energizing the air cleaner is mounted in a recessed area of the carrying handle. The switch preferably includes a pull cord for activating or deactivating the switch.

The elongated body also preferably further includes an integrally molded motor frame and fan venturi. The integrally molded motor frame is constructed for supporting the motor within the elongated body while the fan venturi is located in the vicinity of a motor driven fan blade to facilitate the flow of air through the elongated body.

The fan venturi includes a restricted throat surrounding the motor driven fan blade.

These and other objects and advantages of the present invention will become apparent from the description that follows.

BRIEF DESCRIPTION OF THE DRAWINGS

In the drawings.

Corresponding reference numerals will be used throughout the several figures of the drawings.

DESCRIPTION OF THE PREFERRED EMBODIMENTS

Figure 1:
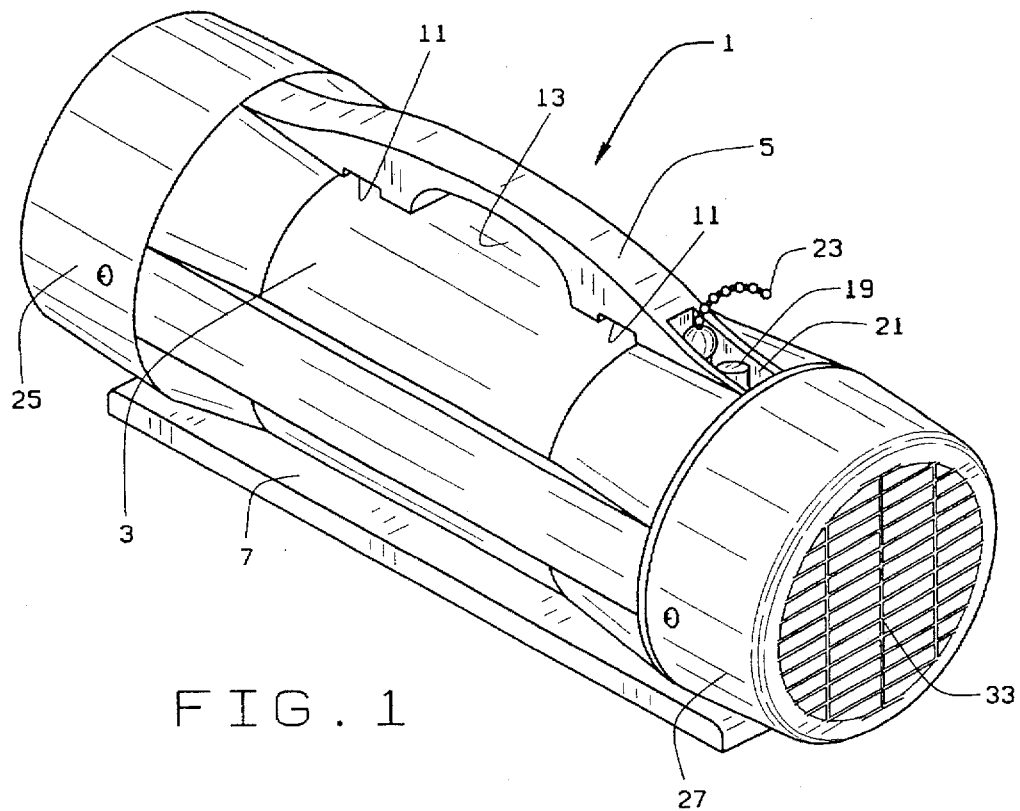
FIG. 1 is a perspective view of a portable/mounting fine dust air cleaner of the present invention.

The following detailed description illustrates the invention by way of example and not by way limitation. This description will clearly enable one skilled in the art to make and use the invention, and describes several embodiments, adaptions, variations, alternatives and uses of the invention, including what I presently believe is the best mode of carrying out the invention.

The portable/mountable air cleaner 1 illustrated in the drawings includes a hollow generally cylindrically shaped elongated body 3 preferably formed from a strong and durable plastic material by suitable molding techniques. The elongated body includes an upstanding integral carrying handle 5 for lifting and transporting the air cleaner 1 to any desired location. Generally opposite the upstanding integral carrying handle 5 is a supporting base 7 for resting the air cleaner 1 on a supporting surface. In this regard, it will be noted that the supporting base 7 extends laterally outwardly beyond the elongated body 3 on opposite sides thereof in order to provide a stable and secure supporting structure for resting the air cleaner 1 on a supporting surface.

Figure 2A:
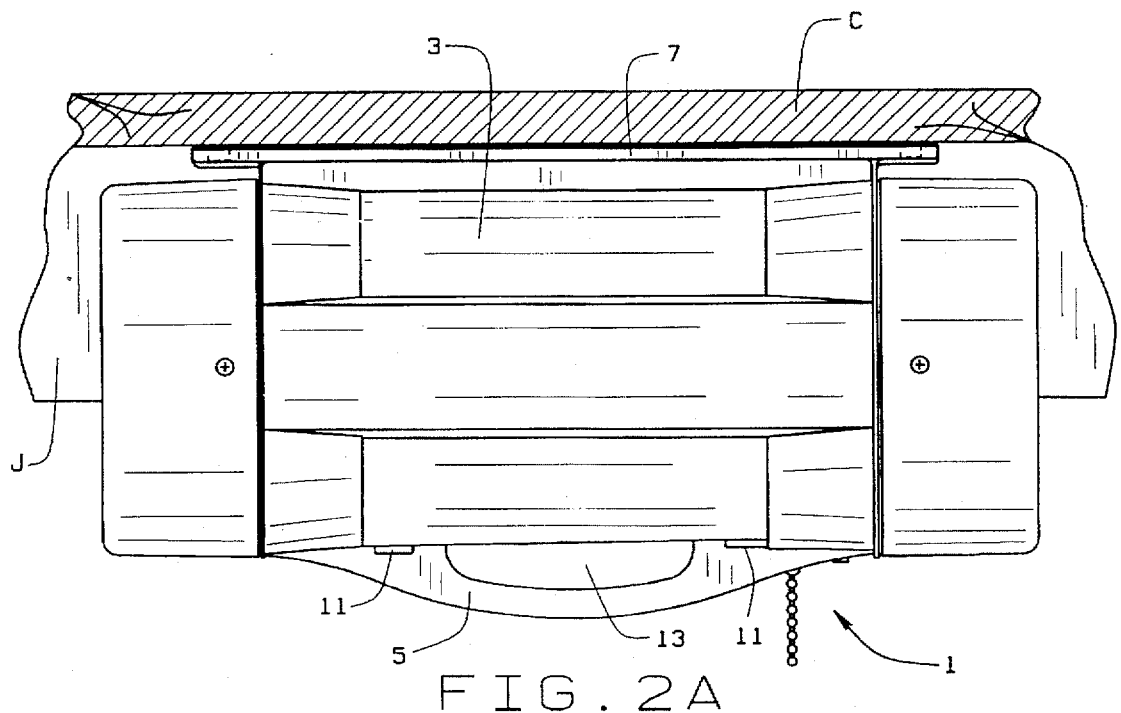
FIG. 2A is a side elevational view, partly in section, illustrating the air cleaner mounted between the joists in a ceiling structure.
Figure 2B:
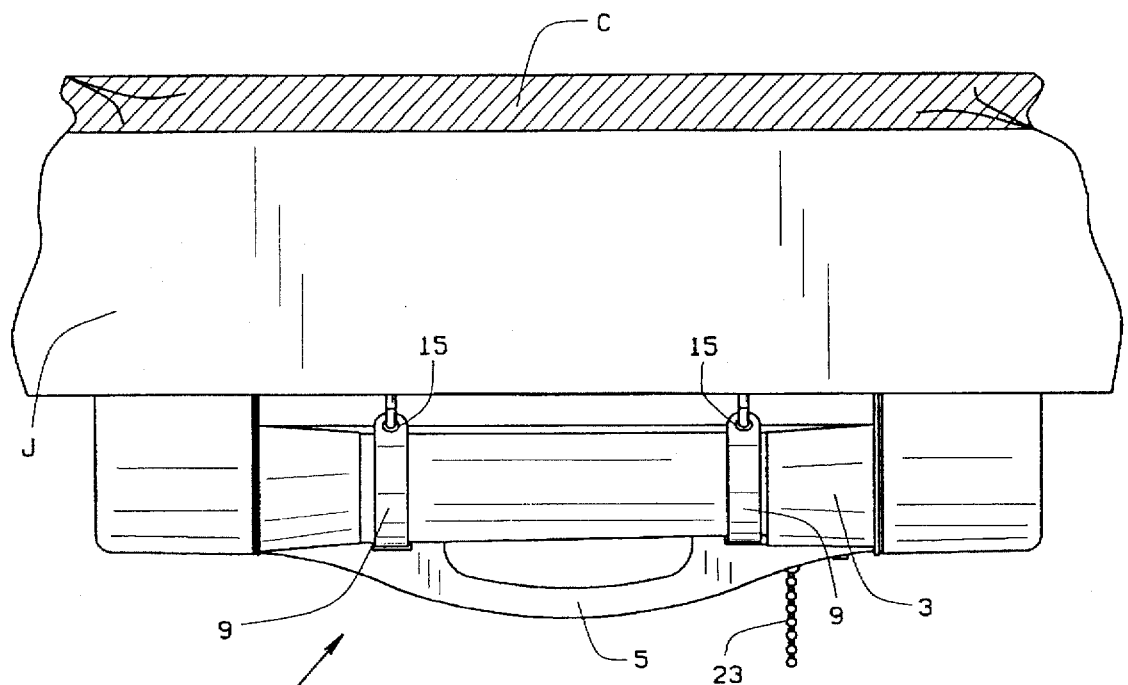
FIG. 2B is a side elevational view, partly in section, showing the air cleaner partially visible below the joists in a ceiling structure.
Figure 2C:
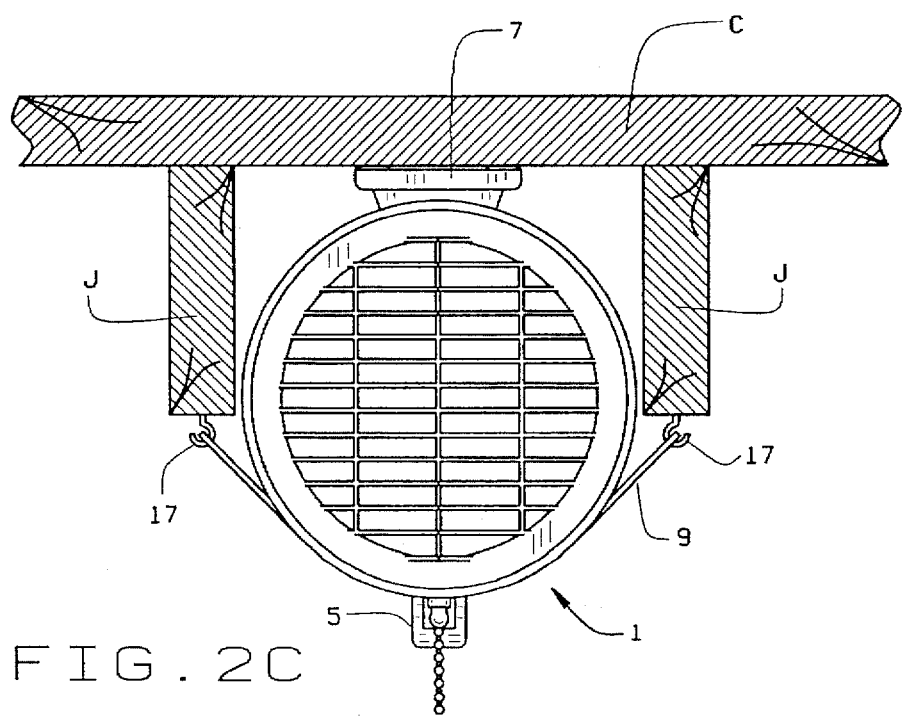
FIG. 2C is an end elevational view, partially in section, showing the air cleaner mounted between the joists in a ceiling structure.

The air cleaner 1 is also capable of being mounted between adjacent joists J, J of a ceiling structure C, as illustrated in FIGS. 2B–2C of the drawings. Alternatively, the air cleaner 1 may be mounted across the joists J, J or on a wall or other structure (not shown) as will be apparent. For mounting the air cleaner 1 between the adjacent joists J, J of a ceiling structure C, it will be seen that the elongated body 3 of the air cleaner 1 is dimensioned, configured and arranged to fit between the spaced joists J, J, while the supporting base 7 rests against an interconnecting strut of the ceiling structure C, as best seen in FIG. 2C of the drawings.

Figure 3:
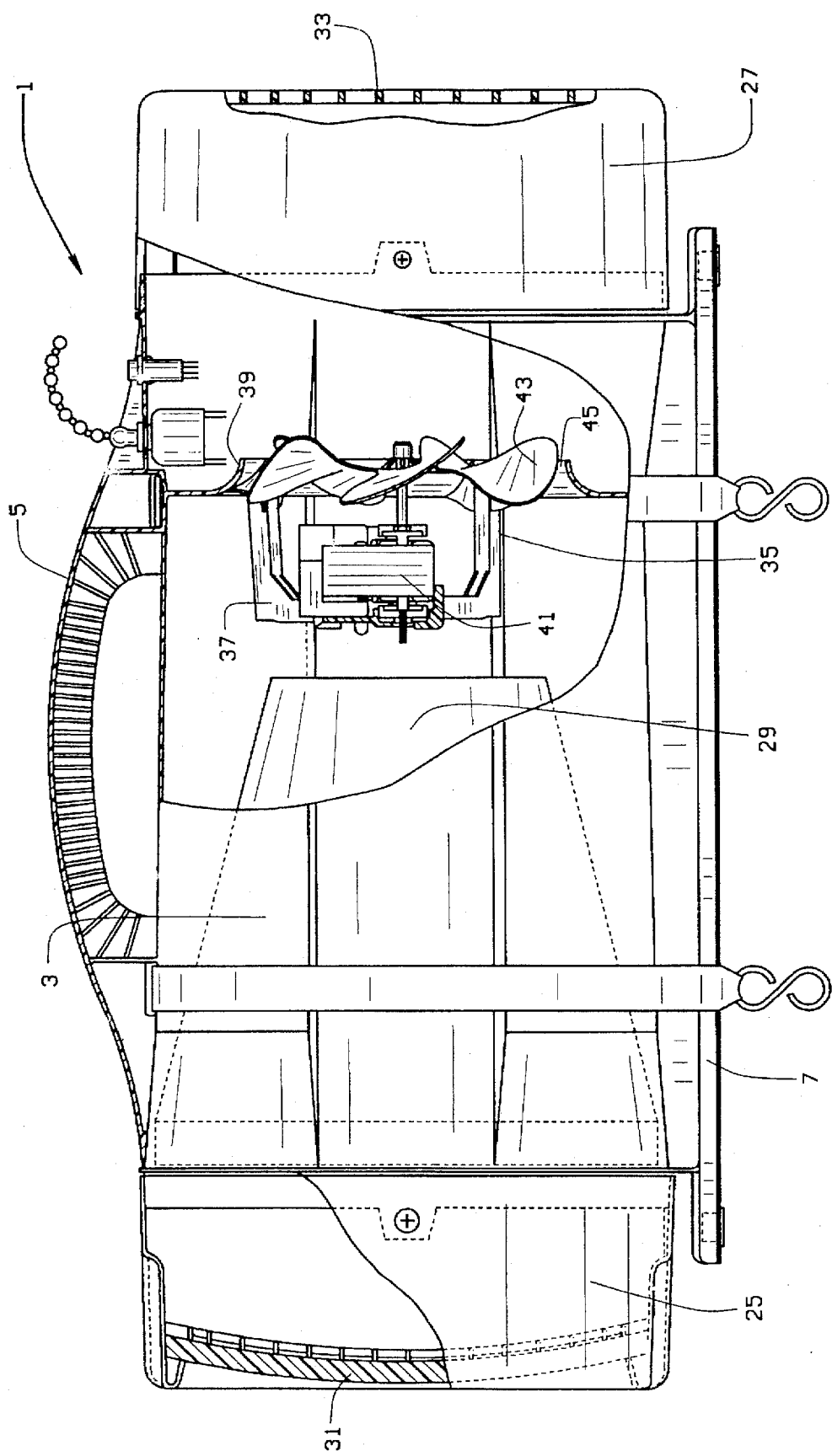
FIG. 3 is an enlarged side elevational view, partially in section, illustrating the air cleaner with the integrally molded motor frame and fan venturi.

The air cleaner 1 is constructed to include spaced, detachable suspension straps 9, 9 which extend through spaced slots 11, 11 on opposite sides of an opening 13 in the carrying handle 5. The opening 13 in carrying handle 5 is large enough to facilitate grasping by a user, while the spaced slots 11, 11 detachably receive the spaced suspension straps 9, 9. At the outer opposite ends of each of the spaced suspension straps 9, 9, complementary openings 15, 15 may be provided for engaging complementary hook fasteners 17, 17 mounted at the lower end of the spaced joists J, J, as shown in FIG. 2C of the drawings. Alternatively, the outer free ends of the spaced suspension straps 9, 9 may themselves be provided with hook fasteners, as shown in FIG. 3 of the drawings, for engaging complementary fasteners (not shown) extending from the lower end of the spaced joists J, J.

In view of the above description, it will be appreciated that the air cleaner 1 can be used individually or in banks of air cleaners as portable units which are placed in proximity to an operation that creates contaminated air, or alternatively, the air cleaner 1 can be mounted between spaced joints J, J, as shown in FIGS. 2A–2C of the drawings, in single or multiple units for maximum and efficient operation.

For energizing the air cleaner 1, a switch 19 is mounted in a recessed area 21 of the carrying handle 5. As shown in FIG. 2B of the drawings, the switch 19 includes a pull cord 23 that hangs downwardly from the air cleaner 1 when mounted between spaced joists J, J as shown in FIG. 2B of the drawings. Whether resting on a supporting surface or positioned between spaced joists J, J, the pull cord 23 of the switch 19 is utilized for activating or deactivating the switch 19.

In order to operate as a functional air cleaning unit, the air cleaner 1 includes a releasable/removable closure 25 at the intake end of the elongated body and a releasable/removable closure 27 at the exhaust end of the elongated body 3. The releasable/removable closure 25 is removed for emptying and/or replacing a filter bag 29 extending within the elongated body 3, as shown in FIG. 3 of the drawings. The releasable/removable closure 25 also has an intake filter or other media element 31 across the intake end of the elongated body 3 which serves as a pre-filtering element for the air cleaner 1. The releasable/removable closure 27 at the exhaust end of the elongated body 3 also has a grill or filter 33 through which air is exhausted from the air cleaner 1.

The air cleaner 1 of the present invention further includes an integrally molded motor frame and fan venturi 35, as best seen in FIG. 3 of the drawings. Specifically, the integrally molded motor frame and fan venturi 35 is supported by suitable fasteners or the like within the elongated body 3 in the position illustrated in FIG. 3. The integrally molded motor frame and fan venturi 35 includes a motor supporting section 37 and a fan venturi section 39. The motor supporting section 37 supports the motor 41 in a generally centralized position within the elongated body 3 and drives the fan blade 43. The fan venturi section 39 is located in proximity to the motor driven fan blade 43 to facilitate the flow of air through the elongated body 3. In this regard, it will be noted that the fan venturi section 39 includes a restricted throat 45 surrounding the fan blade 43 to facilitate the flow of air through the elongated body 3.

Thus, the integrally molded motor frame and fan venturi 35 functions both to support the motor 41 while positioning the restricted throat 45 of the fan venturi section 39 in proximity to the motor driven fan blade 43 to facilitate the flow of air through the elongated body 3 of the air cleaner 1.

From the foregoing, it will now be appreciated that the portable/mountable air cleaner 1 of the present invention enables the air cleaner 1 to be readily transported by the carrying handle 5 to a desired location for resting on a supporting surface or can be mounted through the spaced suspension straps 9 to a ceiling structure C, such as by locating the air cleaner 1 between spaced joists J, J of the ceiling structure. The air cleaner 1 can be mounted to a ceiling structure in any desired manner or to a wall or other structure, if desired. In addition, the integrally molded motor frame and fan venturi 35 enables the motor to be mounted within the elongated body 3 while permitting a motor driven fan blade 43 to be positioned in proximity to the integrally molded fan venturi section 39 to facilitate the flow of air through the elongated body 3.

In view of the above, it will be seen that the several objects and advantages of the present invention have been achieved and other advantageous results have been obtained.

As various changes could be made in the above constructions without departing from the scope of the invention, it is intended that all matter contained in the above description or shown in the accompanying drawings shall be interpreted as illustrative and not in a limiting sense.

I claim:

1. A portable/mountable air cleaner comprising:
   an elongated body containing an air cleaner including a power driven fan blade, the elongated body defining at least two strap receiving members that extend transversely to the elongated body;
   a support base extending from the elongated body for resting on a supporting surface;
   a carrying handle extending from the elongated body generally opposite the supporting base; and
   at least two spaced suspension straps associated with the elongated body for mounting the elongated body to a ceiling or wall structure wherein the spaced suspension straps are positioned within the strap receiving members and wherein the spaced suspension straps are positioned about at least a portion of the elongated body.

2. The portable/mountable air cleaner as defined in claim 1 in which the spaced suspension straps are detachably associated with the elongated body.

3. The portable/mountable air cleaner as defined in claim 2 in which the spaced suspension straps extend transversely to the elongated body.

4. A portable/mountable air cleaner comprising:
   an elongated body containing an air cleaner including a power driven fan blade;
   a support base extending from the elongated body for resting on a supporting surface;
   a carrying handle extending from the elongated body generally opposite the supporting base; and
   spaced suspension straps associated with the elongated body for mounting the elongated body to a ceiling or wall structure wherein:
   the spaced suspension straps are detachably associated with the elongated body;
   the spaced suspension straps extend transversely to the elongated body; and
   the spaced suspension straps extend through spaced slots formed in the elongated body.

5. The potable/mountable air cleaner as defined in claim 4 in which the spaced slots are formed in the carrying handle.

6. The portable/mountable air cleaner as defined in claim 5 in which the spaced suspension straps extend on each side of an opening in the carrying handle that is large enough to facilitate grasping by a user.

7. The portable/mountable air cleaner as defined in claim 6 including openings at the outer free ends of each of the spaced suspension straps for engaging complementary fasteners mounted to the ceiling or wall structure.

8. A portable/mountable air cleaner comprising:
   an elongated body containing an air cleaner including a power driven fan blade;
   a support base extending from the elongated body for resting on a supporting surface;
   a carrying handle extending from the elongated body generally opposite the supporting base;
   a switch for energizing the air cleaner mounted in a recessed area of the carrying handle; and
   spaced suspension straps associated with the elongated body for mounting the elongated body to a ceiling or wall structure.

9. The portable/mountable air cleaner as defined in claim 8 in which the switch includes a pull cord for activating or de-activating the switch.

10. The portable/mountable air cleaner as defined in claim 1 in which the elongated body is configured, arranged, and dimensioned to fit between joists in a ceiling structure.

11. A portable/mountable air cleaner comprising:
    an elongated body containing an air cleaner including a power driven fan blade;
    a supporting base extending from the elongated body for resting on a supporting surface;
    a carrying handle extending from the elongated body generally opposite the supporting base; and
    spaced slots formed in the elongated body adapted to receive spaced suspension straps for mounting the elongated body to a ceiling or wall structure.

12. A portable/mountable air cleaner comprising:
    an elongated body containing an air cleaner including a fan blade, the elongated body being formed so as to define spaced strap receiving members;
    a motor within the elongated body for driving the fan blade;
    an integrally molded motor frame and fan venturi within the elongated body, said integrally molded frame supporting the motor within the elongated body while the fan venturi is located in the vicinity of the fan blade to facilitate the flow of air through the elongated body; and
    spaced suspension straps positioned within the strap receiving members for mounting the air cleaner to either a wall or ceiling structure.

13. The portable/mountable air cleaner as defined in claim 12 in which the fan venturi includes a restricted throat surrounding the fan blade.

14. The portable/mountable air cleaner as defined in claim 13 in which the portable/mountable means includes a carrying handle for lifting and carrying the air cleaner.

15. The portable/mountable air cleaner as defined in claim 14 in which the strap receiving members comprise slots for receiving the suspension straps for mounting the air cleaner to a ceiling or wall structure.

16. A portable/mountable air cleaner comprising an air cleaner positioned at least partially within an elongate body, wherein the elongate body is formed with spaced slots therein to accommodate spaced suspension straps for mounting the air cleaner to either a wall or ceiling structure.

17. A portable/mountable air cleaner comprising an air cleaner positioned at least partially within an elongate body, a carrying handle extending from the elongate body, and a switch for energizing the air cleaner which is mounted in a recessed area of the carrying handle.

* * * * *